United States Patent
Weerasinghe

(10) Patent No.: US 9,241,184 B2
(45) Date of Patent: Jan. 19, 2016

(54) CLOTHING VISUALIZATION

(75) Inventor: Srilal Weerasinghe, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 235 days.

(21) Appl. No.: 13/150,568

(22) Filed: Jun. 1, 2011

(65) Prior Publication Data

US 2012/0310791 A1    Dec. 6, 2012

(51) Int. Cl.
*G06Q 30/00* (2012.01)
*H04N 21/431* (2011.01)
*H04N 21/4725* (2011.01)
*H04N 21/478* (2011.01)

(52) U.S. Cl.
CPC ....... *H04N 21/4312* (2013.01); *H04N 21/4725* (2013.01); *H04N 21/47815* (2013.01)

(58) Field of Classification Search
CPC .......... H04N 21/4312; H04N 21/4725; G06Q 30/0601
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 5,696,965 A * | 12/1997 | Dedrick ........................ | 709/203 |
| 5,778,177 A | 7/1998 | Azar | |
| 5,930,769 A * | 7/1999 | Rose .......................... | 705/26.81 |
| 5,983,200 A * | 11/1999 | Slotznick ................... | 705/26.43 |
| 6,307,568 B1 * | 10/2001 | Rom ............................. | 345/629 |
| 6,546,309 B1 | 4/2003 | Gazzuolo | |
| 6,901,379 B1 | 5/2005 | Balter et al. | |
| 6,965,873 B1 | 11/2005 | Rhoads | |
| 7,149,665 B2 | 12/2006 | Feld | |
| 7,164,413 B2 | 1/2007 | Davis et al. | |
| 7,346,543 B1 | 3/2008 | Edmark | |
| 7,433,753 B2 | 10/2008 | Okada et al. | |
| 7,479,956 B2 | 1/2009 | Shaw-Weeks | |
| 7,826,997 B2 * | 11/2010 | Wang ........................... | 702/127 |
| 8,290,827 B2 * | 10/2012 | Piepenbrink et al. ........ | 705/26.7 |
| 2001/0026272 A1 | 10/2001 | Feld | |
| 2005/0234782 A1 * | 10/2005 | Schackne et al. ............... | 705/27 |
| 2006/0080182 A1 | 4/2006 | Thompson | |
| 2007/0005795 A1 * | 1/2007 | Gonzalez ..................... | 709/232 |
| 2007/0130020 A1 | 6/2007 | Paolini | |

(Continued)

OTHER PUBLICATIONS

Paul Nicholls, "ModaCAD Delivers E-Commerce Software for Fashion", Aug. 20, 1998. Retrieved from http://www.internetnews.com/ec-news/article.php/29811.*

(Continued)

*Primary Examiner* — Naeem Haq
(74) *Attorney, Agent, or Firm* — Toler Law Group, PC

(57) ABSTRACT

A method includes receiving an indication of interest in a garment depicted within media content displayed at a video display and determining, based on the media content, one or more garment identifiers associated with the garment. The method includes after determining the one or more garment identifiers, generating an image representation including a garment overlay and a viewer representation, the garment overlay at least partially covering the viewer representation. The viewer representation is generated based at least partially upon measurement input associated with the viewer. The garment overlay is based at least partially on the one or more garment identifiers and at least partially on the measurement input.

17 Claims, 4 Drawing Sheets

(56) References Cited

U.S. PATENT DOCUMENTS

| | | | |
|---|---|---|---|
| 2008/0290987 A1* | 11/2008 | Li | 340/5.1 |
| 2009/0018926 A1* | 1/2009 | Buehlman | 705/26 |
| 2009/0115777 A1 | 5/2009 | Reyers Moreno | |
| 2010/0023426 A1* | 1/2010 | Wannier et al. | 705/27 |
| 2010/0030578 A1 | 2/2010 | Siddique | |
| 2010/0070858 A1 | 3/2010 | Morris et al. | |
| 2010/0100828 A1 | 4/2010 | Khandelwal et al. | |
| 2010/0100907 A1 | 4/2010 | Chang et al. | |
| 2010/0100916 A1 | 4/2010 | Clayton et al. | |
| 2010/0111370 A1 | 5/2010 | Black et al. | |
| 2011/0107263 A1* | 5/2011 | Ivanov | 715/823 |
| 2011/0154404 A1 | 6/2011 | Piepenbrink et al. | |
| 2013/0085851 A1 | 4/2013 | Pedro et al. | |

OTHER PUBLICATIONS

Wei Zhang et al. "An Intelligent Fitting Room Using Multi-Camera Perception", IUT08, Jan. 13-16, 2008, Maspalomas, Gran Canaria, Spain. Copyright 2008 ACM 978-1-59593-987-6/ 08, pp. 60-69.*

Sven Molkenstruck et al. "3D Body Scanning in a Mirror Cabinet", DAGM 2008, LNCS 5096, pp. 284-293, 2008. © Springer-Verlag Berlin Heidelberg 2008.*

Paul Nicholls "ModaCAD Delivers E-Commerce Software for Fashion", Aug. 20, 1998. Retrieved from http://www.internetnews.com/ec-news/article.php/29811.*

Nils van Kleef et al. "Success factors for Augmented Reality Business Models", University of Twente, Jul. 2010.*

3D Body Scanner, Virtual Try-on, Cornell University, Retrieved from <<http://web.archive.org/web/20100824110348/http://www.bodyscan.human.cornell.edu/scene81bb.html>>, Archive from Aug. 24, 2010, 2 pages.

3D Body Scanning, 3D Body Scanning & Technology Development, Retrieved from <<http://web.archive.org/web/20100810035413/http://www.tc2.com/index_3dbodyscan.html>>, Archive from Aug. 10, 2010, TC2, Cary NC, 1 page.

3D Internet 3D Shopping—YouTube, Retrieved from <<http://www.youtube.com/watch?v=d7EjqWbwmsk&feature=related>>, Video uploaded on Jul. 3, 2008, 3 pages.

HbbTV = More Entertainment at your Command, Retrieved from http://web.archive.org/web/20110305095349/http://hbbtv.org/>>, Archive from Mar. 5, 2011, 3 pages.

Holmes, E., "The Golden Age of TV Shopping", The Wall Street Journal—Life & Culture, Nov. 11, 2010, 3 pages.

Jacobs, K., "Sears to Offer Virtual Dressing Room", Reuters.com, Retrieved from <<http://blogs.reuters.com/shop-talk/2008/09/18/sears-to-offer-virtual-dressing-room/>>, Sep. 18, 2008, 3 pages.

The Fitting Process, Retrieved from <<http://web.archive.org/web/20100408235652/http://intellifit.uniquescan.com/fitting_process/>>, Archive from Apr. 8, 2010, Intellifit Corporation, 1 page.

TinEye Reverse Image Search, Retrieved from <<http://web.archive.org/web/20110409075856/http://www.tineye.com/>>, Archive from Apr. 9, 2011, 1 page.

Try on Glasses with the FrameFinder Virtual Try-on, framesdirect.com, Retrieved from <<http://web.archive.org/web/20110412120233/http://www.framesdirect.com/tryon/framefinder.aspx>>, Archive from Apr. 12, 2011, 6 pages.

Upload Your Photo—Try on Virtual Frames for Eyeglasses, Retrieved from <<http://web.archive.org/web/20110420150836/http://www.firmoo.com/tryon/>>, Archive from Apr. 20, 2011, Firmoo.com, 4 pages.

Greene, L., "Next Big Trend: Virtual Fitting Rooms", Financial Times, Retrieved from <<http://www.ft.com/intl/cms/s/2/57b1fea6-1f55-11e0-8c1c-00144feab49a.html#axzz2uGf62soj>>, Jan. 14, 2011, 3 pages.

May-Plumlee, T., et al., "3D Virtual Draping with Fabric Mechanics and Body Scan Data", NTC Project F02-NS08, National Textile Center Research Briefs—Fabrication Competency, Jun. 2003, Retrieved from <<http://www.ntcresearch.org/pdf-rpts/Bref0605/F02-NS08-05e.pdf>>, 2 pages.

* cited by examiner

CLOTHING VISUALIZATION

FIELD OF THE DISCLOSURE

The present disclosure is generally related to presentation of a representation of a garment to a viewer.

BACKGROUND

Some television network stations are dedicated to shopping and may feature articles of clothing for purchase by a viewer. The viewer may elect to purchase a garment by placing an order via telephone or via a website. The viewer may not be able to judge a quality of fit of the garment prior to receiving the garment, and the viewer may not be able to estimate a size (such as an "off the shelf" size) that would result in an acceptable fit when worn by the viewer. Further, the viewer may not be able to visualize the garment in a variety of colors or print patterns in order to select a desirable color and/or print pattern of the garment to be purchased.

DETAILED DESCRIPTION

Figure 1:
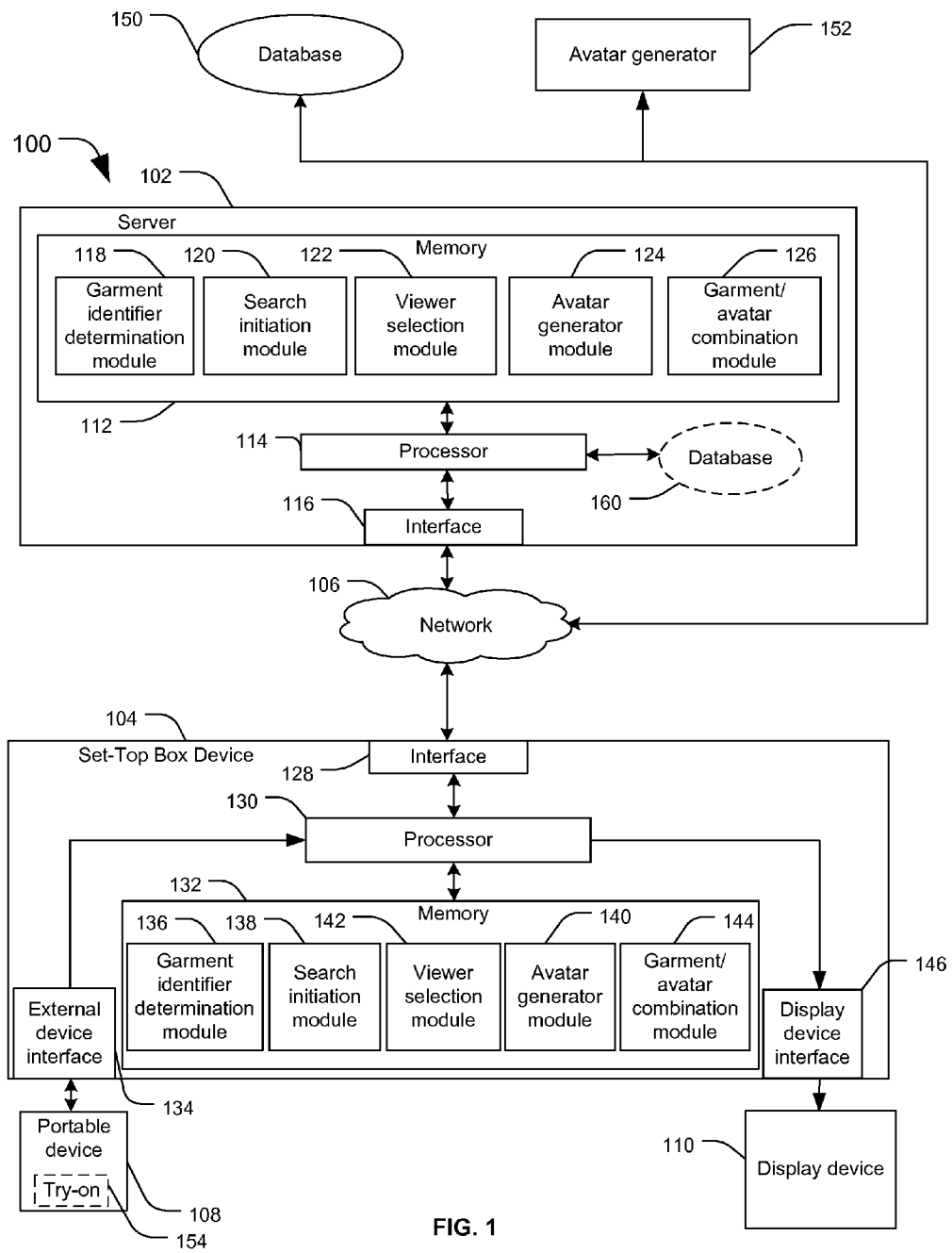
FIG. 1 is a block diagram illustrating a particular embodiment of a system to provide a visualization of a selected garment.

A viewer watching video content may have interest in purchasing an article of clothing that the viewer has seen in a media content presentation. For example, a newscaster may be wearing a garment of interest to a subscriber to television content that is provided by a media content service, such as an internet protocol television network. The viewer (subscriber, user, and viewer are used interchangeably herein unless otherwise noted) may isolate a representation of the garment of interest, e.g., by capturing a still image of the newscaster wearing the garment of interest. The viewer may indicate interest in the garment and may request that a system determine one or more garment identifiers associated with the garment of interest. For instance, the garment identifiers may include parameters including manufacturer name, designer name, garment name, garment color, type of garment (e.g., coat, dress, slacks, shirt, etc.), other parameters, or a combination thereof. The system may initiate a search of a garment database using the garment identifiers that have been determined to identify the garment of interest and to access other information pertaining to the garment, e.g., availability for purchase.

The garment database may include representations of garments that may be searchable using the garment identifiers. The search of the garment database may produce a match of a garment representation to the garment identifiers. When a match is produced, the system may construct a viewer representation (e.g., an avatar, such as a viewer avatar), based upon measurement input (such as viewer supplied body measurements) that may be provided by the viewer or may be made available by the viewer, e.g., uploaded from a body measurement scanner. The system may drape the viewer representation with a garment overlay that is based upon the match and that is sized according to the measurement input. For instance, a garment size may be selected by the system from "off the shelf" garment sizes associated with the garment of interest, and the garment overlay may be draped over the viewer representation. The resulting image representation including the viewer representation dressed with the garment overlay may be provided for viewing by the viewer. The viewer may be able to view the image representation from a plurality of angles, and the viewer may be able to change the size of the garment of interest and view a modified image representation in response to the changed size of the garment.

In the event that an exact match is not found in the database, the viewer may be presented with several potential matches, and the viewer may be prompted to select a particular garment representation from the potential matches. A garment overlay based on the particular garment representation may be draped over the viewer representation, and the resulting image representation may be provided for viewing by the viewer.

In a particular embodiment, a method includes receiving an indication of interest in a garment depicted within media content displayed at a video display. The method includes determining, based on the media content, one or more garment identifiers associated with the garment. The method includes, after determining the one or more garment identifiers, generating an image representation including a garment overlay and a viewer representation. The garment overlay at least partially covers the viewer representation. The viewer representation is generated based at least partially upon measurement input that is associated with a viewer. The garment overlay is based at least partially on the one or more garment identifiers and at least partially on the measurement input.

In a particular embodiment, an apparatus includes a processor configured to receive an indication of interest in a garment depicted by media content displayed at a video display. The apparatus may be configured to determine, based on the media content, one or more garment identifiers associated with the garment. The apparatus may be configured to, after determining the one or more garment identifiers, generate an image representation including a garment overlay and a viewer representation. The garment overlay at least partially covers the viewer representation. The viewer representation is generated based at least partially upon measurement input associated with a viewer. The garment overlay is based at least partially on the one or more garment identifiers and at least partially on the measurement input.

In a particular embodiment, a computer-readable medium stores processor-executable instructions that, when executed by a processor, cause the processor to receive an indication of interest in a garment depicted within media content displayed at a video display and to determine, based on the media content, one or more garment identifiers associated with the garment. The processor-executable instructions, when executed by a processor, cause the processor to, after determining the one or more garment identifiers, generate an image representation including a garment overlay and a viewer representation. The garment overlay at least partially covers the viewer representation. The viewer representation is generated based at least partially upon measurement input associated with a viewer. The garment overlay is based at least partially on the one or more garment identifiers and at least partially on the measurement input.

FIG. 1 is a block diagram illustrating a particular embodiment of a system 100 to enable presentation of an image representation related to a garment of interest to a viewer. The system 100 may include a server 102 that may provide media content, such as video content, to one or more set-top box devices, such as a set-top box device 104, via a network, such as a network 106. The network 106 may be a computer network, a fiber optic network, a cable network, a satellite network, another type of network, or any combination thereof.

The server 102 may include a memory 112, a processor 114, and an interface 116. Optionally, the server 102 may include a database 160. The interface 116 enables communication between the server 102 and one or more devices coupled to the network 106. For example, the server 102 may be configured to couple to a remote database 150 through the interface 116. The server 102 may also be configured to couple to an avatar generator 152 through the interface 116.

The memory 112 of the server 102 may include various modules that are executable to implement functions of the server 102, such as a garment identifier determination module 118, a search initiation module 120, an avatar generator module 124, a viewer selection module 122, and a garment/avatar combination module 126. The garment identifier determination module 118 may include processor-executable instructions that when executed by the processor 114 cause the processor 114 to determine one or more garment identifiers associated with a garment of interest to a viewer. For example, the viewer may indicate that a garment being worn by a newscaster is of interest to the viewer. When the garment identifier determination module 118 is invoked by the processor 114, the processor 114 endeavors to locate garment identifiers that include one or more parameters associated with the garment of interest. For example, upon indication by the viewer that a garment of interest appears in an image that is displayed, a timestamp and/or channel associated with the image may be retrieved from a provider of the media content. The timestamp and/or channel may be used by the garment identifier determination module 118 along with interactive viewer input to pinpoint the garment of interest and to locate, e.g., through a database (not shown), garment identifiers associated with the garment. Alternatively or in addition, the garment of interest may be identified by the viewer within the image displayed through interactive viewer input, and the identified image may be scanned and compared to a fabric database (not shown) to derive the garment identifiers. The garment identifiers may include an identifier of a manufacturer of the garment, a garment name, a designer name, a style number, a color identifier, a style identifier, a model name, a model identifier, a color identifier, a shape identifier, a pattern identifier, a cut identifier, a garment designer identifier, another identifier that is associated with the garment of interest, or a combination thereof.

The search initiation module 120 may include processor-executable instructions that when executed by the processor 114, cause the processor 114 to initiate a search for a garment representation match (also referred to as a match herein), i.e., a garment representation that matches the garment of interest. For example, the processor 114 may contact a database, such as the database 150 that stores information pertaining to garments, to identify a match of one or more garment representations stored in the database 150 to the garment identifiers associated with the garment of interest. Alternatively or in addition, the processor 114 may search the internal database 160 that includes a database of garment representations to locate a match based on the garment identifiers. By executing the instructions in the search initiation module 120 applied to the garment identifiers determined via the garment identifier determination module 118, the processor 114 may locate one or more matches to the garment of interest. The search may be conducted without accessing any garment-related metatag information embedded within the media content (e.g., metatag indicators indicating manufacturer name, style number, etc.). For example, when a garment is depicted in a non-sale setting, e.g., a garment worn by a newscaster or by an actor or actress in a television program, garment-related metatag information may not be available within the media content presented, and the garment of interest may not be indicated within the media content as being for sale. In another example, a garment may be viewed on a home shopping channel and the garment may have garment-related metatag information embedded within the media content. The embedded garment-related metatag information may include identifiers that are sufficient to specify the garment of interest without conducting a search to produce a garment representation match to the garment of interest.

The avatar generator module 124 may include processor-executable instructions that when executed by the processor 114, cause the processor 114 to generate a viewer representation. For example, the viewer representation may be generated with proportions based upon measurement input provided by the viewer. The measurement input may be received directly from the viewer or may be uploaded from a database of viewer information. For example, measurement input may have been provided to the database from a virtual body measurement station that the viewer may have visited to record body measurements of the viewer. Thus, the viewer representation may have body characteristics that correspond to body characteristics of the viewer. In a particular embodiment, the viewer representation may be customizable based on viewer input to more closely resemble the viewer. For example, the viewer representation may be customized by adding a representation of the viewer's face to the viewer representation, modifying a skin tone of the viewer representation, adding facial hair, changing a hair style of the viewer representation, or by another modification of the viewer representation, or by any combination thereof.

Alternatively or in addition, the processor 114 may communicate with the avatar generator 152 via the network 106 to request generation of the viewer representation. The processor 114 may supply the avatar generator 152 with the measurement input that has been provided by the viewer or that has been accessed from a database. The avatar generator 152 may return to the processor 114 information associated with displaying the viewer representation.

The garment/avatar combination module 126 may include processor-executable instructions that when executed by the processor 114, cause the processor 114 to generate an image representation that includes a garment overlay covering at least a portion of the viewer representation. For example, after conducting the search for the garment representation within a database, such as the database 150, the garment/avatar combination module 126 may drape a garment overlay over the viewer representation to produce the image representation. To illustrate, information descriptive of measurements or properties of the garment in various sizes (e.g., "off the rack" sizes) may be retrieved from the database 150. A size of the garment that may fit the viewer may be selected based on the measurement input. The garment overlay may be rendered based on the selected garment size and the measurement input. The garment overlay may be rendered using a physics engine (e.g., software that can simulate physical systems) to simulate draping and contours of the garment in a real-world environment (e.g., as worn by the viewer), a rendering engine (e.g., software that can simulate lighting, textures, and optical characteristics), or both a physics engine and a rendering engine. Since the properties of the viewer representation correspond to the measurement input, the image representation may simulate appearance and fit of the garment on the viewer. The viewer representation may be used to determine appearance of the garment overlay from multiple angles, or as a three-dimensional representation. Further, information regarding properties of the garment (e.g., material, pattern, color) may be used to simulate draping of the garment on the viewer representation and to add shading and other visual characteristics. Thus, the image representation of the garment of interest draped over the viewer representation may be generated and may be provided for display on a display device, such as a display device 110 or a portable device 108. Optionally, the portable device 108 may include a "try-on" button 154 that, when selected by the viewer, may initiate generation of the image representation.

The server 102 may communicate with the set-top box device 104. For example, the server 102 may send media content, such as network television programming, movies, special broadcasts, advertisements, or a combination thereof, to the set-top box device 104. In another example, the viewer selection module 122 may receive information indicating the viewer selection of the garment of interest. The server 102 may receive viewer measurements generated by the viewer and entered to the set-top box device 104. In another example, the server 102 may access a database to receive viewer measurements. The server 102 may provide to the set-top box device 104 the image representation that includes the garment overlay covering a viewer representation.

The set-top box device 104 may include an interface 128, a processor 130, a memory 132, an external device interface 134, and a display device interface 146. The external device interface 134 may be configured to couple to a portable device, such as the portable device 108. In a particular embodiment, the portable device 108 may be a personal digital assistant, a cell telephone, a smart phone, a remote control device, or another portable digital device. The display device interface 146 may be operable to provide media content to be displayed at the display device 110. For example, the server 102 may provide the media content via the network 106 to the set-top box device 104 via the interface 128. The processor 130 may process the media content for display at the display device 110.

The external device interface 134 may be operable to communicate data to, and to receive data from, the portable device 108. For example, the viewer may view media content provided by the server 102 via the set-top box device 104 at the portable device 108. The set-top box device 104 may receive, via the external device interface 134, an indication of a garment of interest that is being displayed on a display of the portable device 108. The portable device 108 may include a try-on button 154 that, when selected by the viewer, provides the indication of the garment of interest. The try-on button 154 may be a particular hardware button feature of the portable device 108. In another example, the try-on button 154 may be a software graphical user interface button that is selectable by the viewer.

In a particular embodiment, the viewer may capture an image, e.g., a digital photograph or a screen shot of a display screen, using the portable device 108 while the garment of interest is being viewed. In a particular example, the viewer may use a cell phone to capture a digital image including the garment of interest and may upload the digital image to a storage site for retrieval at a later time. The digital image may be downloaded by the viewer to the set-top box device 104 at a subsequent time, e.g., when the viewer is at home. For example, the digital image captured by the portable device 108 may be uploaded by the viewer, e.g., through the set-top box device 104, via a wireless data network or via another network, to a storage site (not shown). The digital image may be downloaded from the storage site to the set-top box device 104 at another time. The digital image may be displayed at the display device 110 via the set-top box device 104. In a particular embodiment, the portable device 108 and the set-top box device 104 may be associated with a common viewer account.

The digital image may include a depiction of the garment of interest within the media content. The viewer may indicate the garment of interest in the captured image, such as by encircling or highlighting the garment of interest, using software that may be available at the portable device 108. Alternatively or in addition, a timestamp associated with the media content and/or a provider channel may be stored to enable a search to identify the garment of interest. The viewer may also provide measurement input, access to a database storing the measurement input, other information, or a combination thereof, to the set-top box device 104 using the portable device 108 communicating via the external device interface 134.

The memory 132 may include various modules that are executable to implement functions of the set-top box device 104. For example, the memory 132 may include a garment identifier determination module 136, a search initiation module 138, an avatar generator module 140, a viewer selection module 142, a garment/avatar combination module 144, or any combination thereof. The garment identifier determination module 136 may include processor-executable instructions that when executed by the processor 130, cause the processor 130 to determine one or more garment identifiers associated with the garment of interest to the viewer. In a particular example, the viewer may have captured an image that includes a depiction of the garment of interest within the media content, and the garment identifiers may be determined based on the captured image. In another example, a time stamp and/or provider channel information that may be available, e.g., from the server 102, may be used to determine the one or more garment identifiers. The garment identifiers may include a garment name, an identifier of a manufacturer of the garment, a model name, a model identifier, color identifier, a shape identifier, a pattern identifier, a cut identifier, a garment designer identifier, other identifying factors associated with the garment of interest, or a combination thereof.

The search initiation module 138 may include processor-executable instructions that, when executed by the processor 130, cause the processor 130 to initiate a search for a garment representation associated with the garment of interest. For example, the processor 130 may initiate a search for the garment representation corresponding to the garment of interest via a query to the database 150. Alternatively or in addition, the processor 130 may initiate the search by directing a query to the database 160 of the server 102. In another example, the processor 130 may send the query for a garment representation associated with the garment of interest to an external source (not shown) via the network 106 and may receive one or more garment representations from the external source coupled to the network 106.

The avatar generator module 140 may include processor-executable instructions that, when executed by the processor 130, cause the processor 130 to generate a viewer representation. For example, the viewer representation may be generated based on measurement input. The measurement input may be provided by the viewer or may be retrieved from a database of measurements that is accessible upon permission by the viewer. The measurement input may have been recorded at another time and at another location. For instance, the viewer may have visited a virtual measurement station (e.g., at a department store or other location) and may have recorded measurement input that may be available via the network 106 (e.g., through a secured access database), or that may be supplied by the viewer via the portable device 108.

The viewer selection module 142 may include processor-executable instructions that, when executed by the processor 130, cause the processor 130 to provide to the viewer a selection of potential matches and to receive a viewer selection of a particular garment representation. For example, the processor 130 may conduct a search based on the garment identifier information. The search may identify more than one garment representation that is a potential match to the garment of interest. Each of the potential matches may correlate to some but not all of the garment identifiers. Alternately, there may be more than one garment representation that correlates to the garment identifiers provided by executing instructions in the garment identifier determination module 136. The plurality of potential matches may be presented to the viewer, e.g. via the portable device 108 or via the display device 110. The viewer may select a particular garment representation from the plurality of garment representations provided.

The garment/avatar combination module 144 may include processor-executable instructions that, when executed by the processor 130, cause the processor 130 to generate an image representation that includes a garment overlay that at least partially covers a viewer representation, such as the viewer representation generated by the avatar generator module 140 or generated by the avatar generator 152. For example, the garment overlay may include a graphical representation of the garment of interest. The image representation may depict the garment overlay on the viewer representation. The image representation may be displayed at the display device 110 or at the portable device 108. The display device 110 and the portable device 108 may be associated with a common viewer account.

In operation, the server 102 may provide media content to the set-top box device 104 via the network 106 for display at the display device 110 or at the portable device 108. In a particular example, the network 106 is an internet protocol television network and the media content may be provided via internet protocol television communications. When the viewer notices a garment of interest being displayed, e.g., a garment being worn by a presenter (e.g., a newscaster, an actor, a sports figure, etc.), the viewer may input an indication of interest via the portable device 108 or via another device coupled to the external device interface 134. Upon receiving the indication of interest, the processor 130 may initiate a determination of one or more garment identifiers that are associated with the garment of interest by executing the instructions in the garment identifier determination module 136. Garment identifiers may include, but are not limited to, a model identifier, a shape identifier, a pattern identifier, a print identifier, a cut identifier, a garment designer identifier, a manufacture of the garment, or a combination thereof. Upon determining one or more garment identifiers, the processor 130 may initiate a database search for a match to the garment of interest. The processor 130, executing the instructions in the search initiation module 138, may query an external database, such as the database 150 or the database 160, via the network 106 to identify one or more matches to the garment of interest.

The processor 130 may identify a match or may identify more than one potential match based on the garment identifiers. For instance, the search may produce one match to the garment of interest, and the match may be presented for display at the portable device 108 or at the display device 110. Alternatively or in addition, the search may yield a plurality of potential matches to the garment of interest. The processor 130 may present the potential matches to the viewer via the portable device 108 or via the display device 110. The viewer may indicate a selection of a particular garment representation from the plurality of potential matches supplied by the processor 130.

The processor 130 may generate viewer representation, based on measurement input, by executing the instructions in the avatar generator module 140. The processor 130 may execute instructions in the garment/avatar combination module 144 to produce an image representation including the garment overlay at least partially covering the viewer representation. The processor 130 may present the image representation at the portable device 108 or at the display device 110.

The viewer may view the image representation including the garment overlay draped over the viewer representation. The viewer may select one or more views of the image representation, such as two-dimensional views that may include a front view, one or more side views, a back view, and/or one or more three-dimensional views. For example, the image representation may include a garment overlay representing an "off the shelf" (also referred to as "off the rack" herein unless indicated otherwise) sized garment of interest that is available for purchase. Thus, the viewer may judge quality of fit of the "off the shelf" size of the garment based on the garment overlay draped over the viewer representation. Advantageously, in advance of ordering the garment, the viewer may judge from the visual display, what the garment may look like on the viewer, e.g., quality of fit of the garment, by viewing one or more views of the garment overlay draping the viewer representation. The viewer may also be able to determine other factors of interest via the database query. For example, the database query may return other information, such as color availability of the garment of interest, lead time for ordering, pricing information, other factors of interest, or a combination thereof.

In another embodiment, the viewer may indicate the garment of interest and the indication of the garment of interest may be provided to the server 102. Within the server 102, the processor 114, executing the instructions in the garment identifier determination module 118, may identify one or more garment identifiers associated with the garment of interest. For example, the processor 114 may query a database to determine garment identifiers such as manufacturer, model, availability for purchase, color available, size availability, other factors of interest, or a combination thereof based upon a digital image or other identifying information of the garment of interest. The processor 114 may initiate a search to determine a match to the garment of interest from a garment database, such as the database 150 or the database 160. For example, the processor 114 may provide the garment identifiers to the database 150 and may query the database 150 for one or more matches.

The processor 114 may query the database 150 via the network 106. Alternatively or in addition, the processor 114 may query the internal database 160. Results of the search may produce a match to the garment of interest. Alternatively or in addition, the search may produce a plurality of potential matches including garment representations that match some but not all of the garment identifiers provided. The processor 114 may prompt the viewer to select a particular potential match from a plurality of potential matches by executing the instructions in the viewer selection module 122. The processor 114, executing instructions in the avatar generator module 124, may construct a viewer representation based on measurement input. Alternatively or in addition, the processor 114 may query an external avatar generator, such as the avatar generator 152, to construct the viewer representation. In a particular embodiment, the viewer representation may be customizable based upon viewer input. For example, the viewer may customize the viewer representation, e.g., by including a representation of a face of the viewer as part of the viewer representation, by modifying a skin tone of the viewer representation, by another modification of the viewer representation, or by any combination thereof.

The processor 114 may combine the match received via the search, or the selection of the particular garment representation provided by the viewer from the potential matches, with the viewer representation to produce an image representation that includes a garment overlay draped over the viewer representation. The processor 114 may present the image representation to the viewer at the portable device 108, or at the display device 110. The processor 114 may enable the viewer to view the image representation in a plurality of two-dimensional and/or three-dimensional views, allowing the viewer to judge the appearance and the quality of fit of an "off the shelf" size of the garment of interest on the viewer representation. For example, the viewer may control the display of the image representation in order to view the garment overlay draped over the viewer representation from a front view, a back view, a side view, or in an animation sequence (e.g., the viewer representation walking, or performing another movement).

In another embodiment, the viewer may be viewing media content provided over a shopping channel at the display device 110 or at the portable device 108. The viewer may indicate interest in a particular garment that is for sale via the shopping channel. The image representation may be based at least in part on garment-related metatag data included in the media content. The media content may include garment-related metatag data associated with each garment presented for sale. For example, the garment-related metatag data may identify characteristics of the particular garment including available sizes, model number, color availability, other characteristics, or a combination thereof. Measurement input may be stored in the memory 132 and may be automatically provided to the processor 130 during execution of the avatar generator module 140. Further, the network 106 may have previously established a secure connection to the set-top box device 104 and to the server 102, enabling the measurement input and/or credit card information to be securely transmitted between the set-top box device 104 and the server 102. For example, the server 102 may store the measurement input in a secure (e.g., encrypted) database where the measurements are password protected. The secure connection, provided e.g., via an internet protocol television service, may facilitate speed of producing an image representation of a garment overlay draping the viewer representation. The viewer may request the image representation, which may be rendered by the set-top box device 104 by executing the avatar generator module 140. The measurement input may be accessible by the set-top box device 104 conditioned on presentation of a viewer password. The viewer representation may be draped with the garment overlay to produce the image representation. The garment overlay may be based at least in part on the garment-related metatag data associated with the media content that is provided with the media content by the media content provider.

Figure 2:
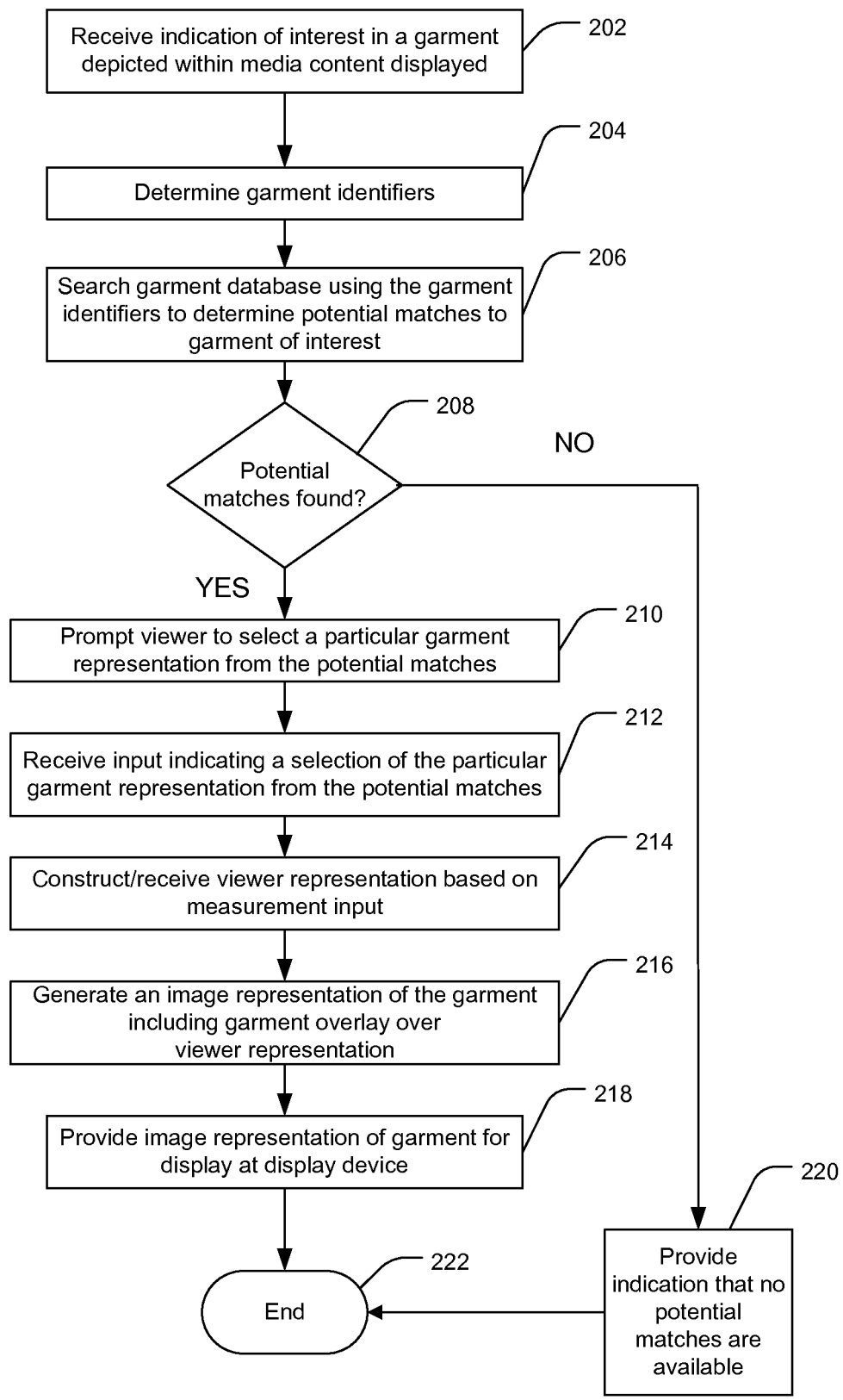
FIG. 2 is a flow diagram illustrating a particular embodiment of a method of providing visualization of a selected garment.

FIG. 2 is a flow diagram illustrating a particular embodiment of a method of providing an image representation of a garment of interest. An indication of interest in a garment depicted within media content being displayed is received, at 202. For example, the set-top box device 104 of FIG. 1 may receive the indication of interest from a viewer through the portable device 108. One or more garment identifiers associated with the garment of interest may be determined, at 204. For example, the processor 130 of FIG. 1 may determine one or more garment identifiers by executing processor-executable instructions in the garment identifier determination module 136. Alternatively or in addition, the processor 114 of FIG. 1 may determine one or more garment identifiers by executing processor-executable instructions in the garment identifier determination module 118.

A search of a garment database may be conducted using the garment identifiers to determine a match or several potential matches to the garment of interest, at 206. For example, the processor 130 of FIG. 1 may conduct a search of the database 150 by executing processor-executable instructions in the search initiation module 138. In another example, the processor 114 of FIG. 1 may conduct a search of the database 150 by executing processor-executable instructions in the search initiation module 120. For example, the search may be conducted without accessing any garment-related metatag information within the media content. The search of the garment database may produce an exact match. Alternatively or in addition, the search of the garment database may produce potential matches that match some but not all of the garment identifiers, at 208. Alternatively or in addition, the search may produce no potential matches to the garment of interest. If there are no potential matches, an indication that no potential matches are available may be provided to the viewer, at 220.

If there is one or more potential match found, at 208, the viewer may be prompted to select a particular garment representation from the potential matches, at 210. For example, the processor 130 of FIG. 1 may prompt the viewer to select the particular garment representation by executing processor-executable instructions in the viewer selection module 142. In another example, the processor 114 of FIG. 1 may prompt the viewer to select the particular garment representation by executing processor-executable instructions in the viewer selection module 122.

Input indicating a viewer selection of a particular garment representation from the potential matches may be received, at 212. For example, the processor 130 of FIG. 1 may receive the viewer selection of the particular garment representation from the potential matches. In another example, the processor 114 of FIG. 1 may receive the viewer selection of the particular garment representation from the potential matches. A viewer representation based on measurement input may be constructed or may be received from an external source, at 214. For example, the processor 130 of FIG. 1 may construct the viewer representation based on the measurement input by executing processor-executable instructions in the avatar generator module 140. In another example, the processor 114 of FIG. 1 may construct a viewer representation based on the measurement input by executing processor-executable instructions in the avatar generator module 124. An image representation including a garment overlay over the viewer representation may be generated, at 216. For example, the processor 130 of FIG. 1 may generate the image representation by executing processor-executable instructions in the garment/avatar combination module 144. In another example, the processor 114 of FIG. 1 may generate the image representation by executing processor-executable instructions in the garment/avatar combination module 126. The image representation may be provided for display at a display device, at 218. For example, the processor 130 of FIG. 1 may provide the image representation for display at the display device 110 or at the portable device 108. In another example, the processor 114 of FIG. 1 may provide the image representation for display at the display device 110 or at the portable device 108. The method ends at 222.

Figure 3:
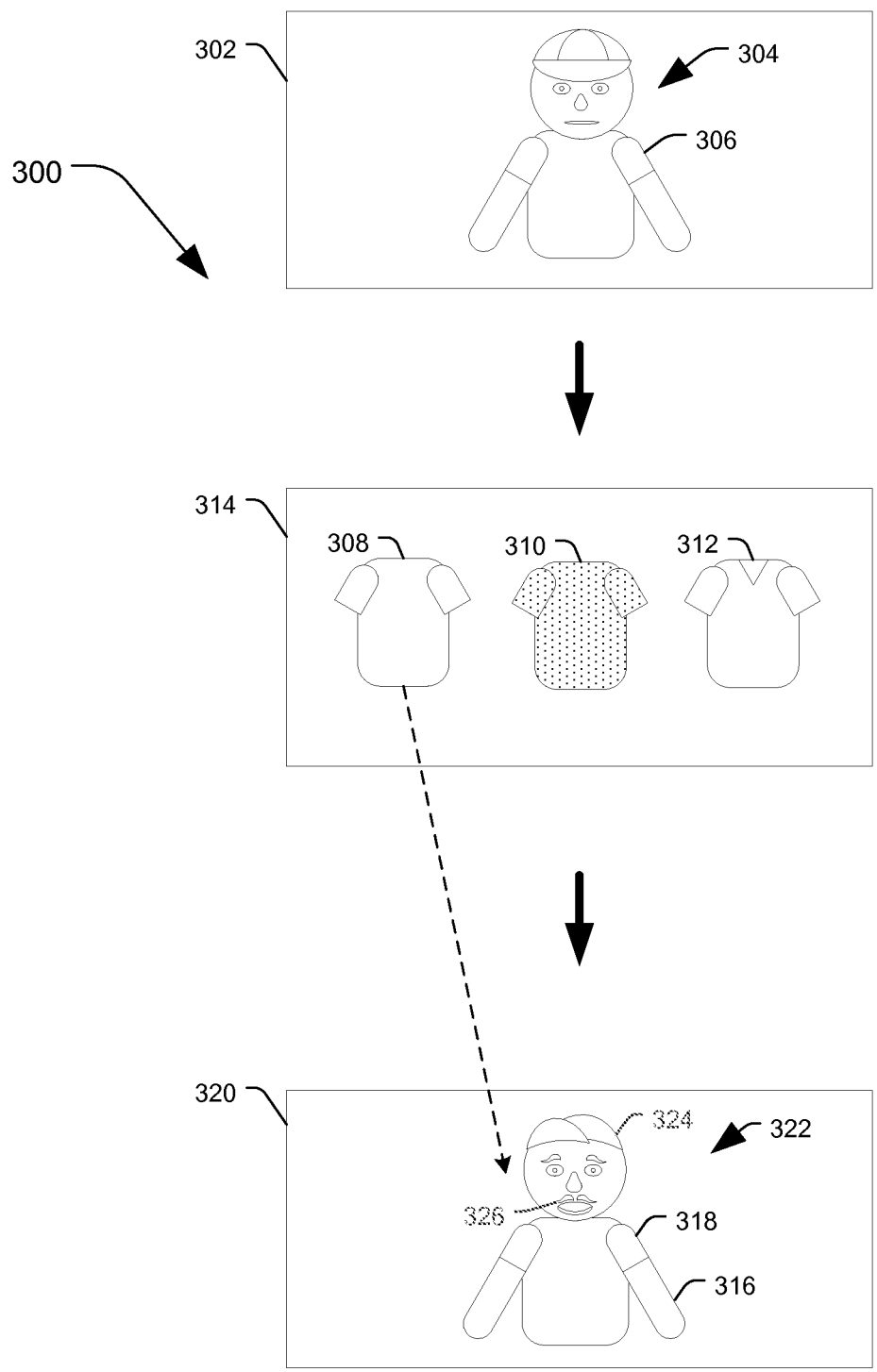
FIG. 3 is an illustration of a particular embodiment of display screens displayed to a viewer of a system to provide visualization of a selected garment.

FIG. 3 is an illustration of a particular embodiment of a set of screens 300 that may be presented to the viewer. A first display screen 302 depicts a presenter 304, such as a newscaster, an actor, or a sports figure, wearing a garment of interest 306. After the viewer has indicated interest in the garment of interest 306, a search may be conducted for matches and/or potential matches to the garment of interest 306.

A second display screen 314 includes three potential matches 308, 310, and 312. Each of the potential matches 308, 310, and 312 may have features that match some but not all of the garment identifiers associated with the garment of interest 306. The viewer may be prompted to make a selection of a particular potential match. For example, the viewer may select the particular garment representation 308. A third display screen 320 includes a garment overlay 318, which corresponds to the particular garment representation 308 chosen by the viewer and sized to a viewer representation 316 based on measurement input. Sizing of the garment overlay 318 may be determined by a garment/avatar combination module, such as the garment/avatar combination module 144, based on "off the shelf" sizes of the garment of interest. The garment overlay 318 may be draped over the viewer representation 316 to produce an image representation 322 that includes the viewer representation 316 and the garment overlay 318. Optionally, the viewer may modify the viewer representation 316, e.g., by adding hair 324, adding a moustache 326, changing a skin tone, modifying facial features, etc. The viewer may optionally view the image representation 322 from a number of angles, e.g., a frontal view, a back view, a 360 degree rotation, etc. The viewer may optionally view the image representation 322 in an animated image sequence, e.g., performing a movement. Thus, the viewer may utilize the image representation 322 to help the viewer to arrive at a decision as to whether the fit, color, and other characteristics of the garment are in accord with viewer interest in wearing the garment of interest. The viewer may then proceed to order the garment of interest in the size associated with the garment overlay. In another example, the viewer may optionally select to change one or more aspects associated with the garment overlay 318 (e.g., a size, a color, a pattern, a print, a fabric, etc.) and may view a modified version of the garment overlay 318 draped over the viewer representation 316.

Figure 4:
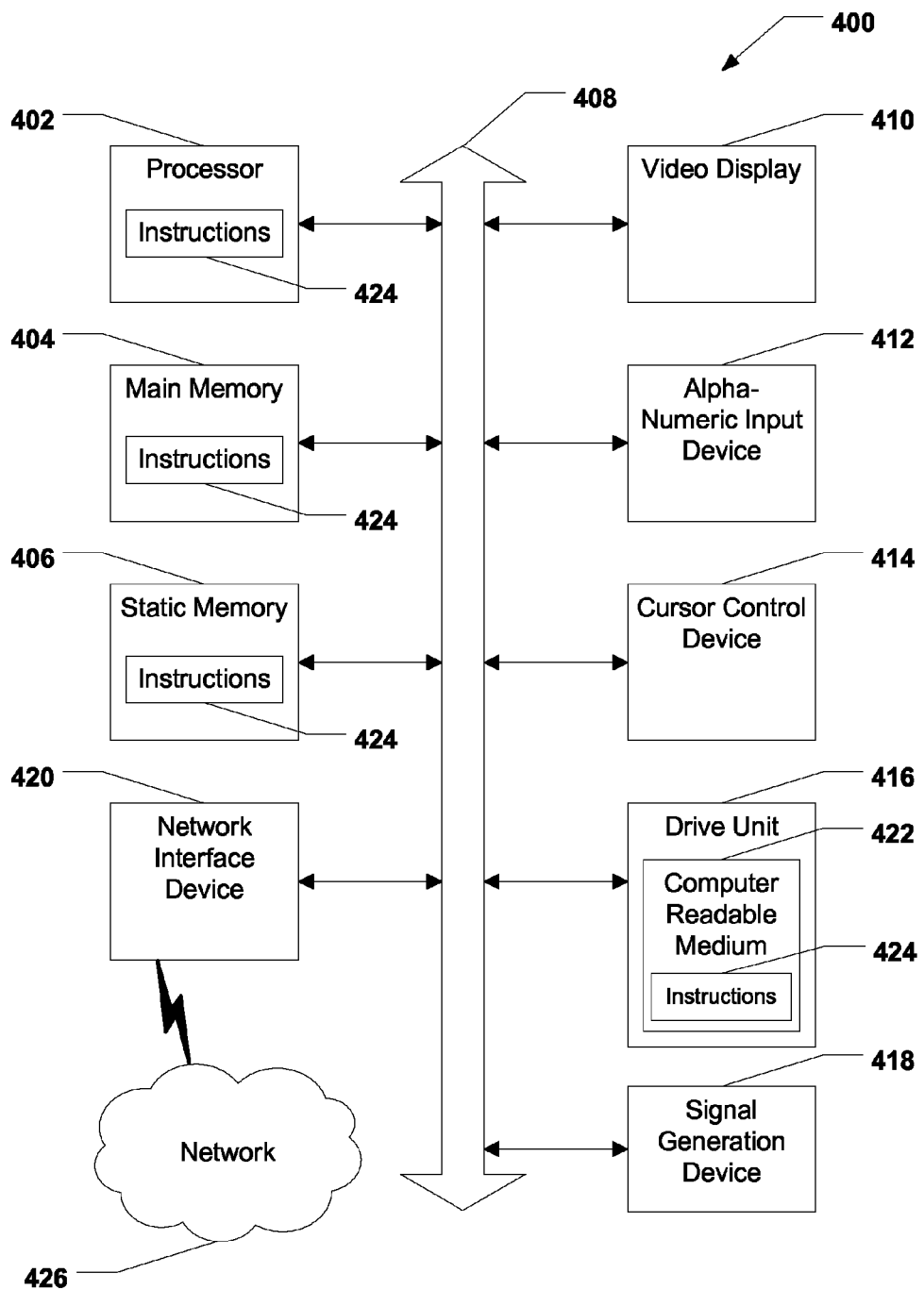
FIG. 4 is an illustration of a general computer system operable to support embodiments of computer-implemented methods, computer program products, and system components as illustrated in FIGS. 1-3.

Referring to FIG. 4, an illustrative embodiment of a general computer system is shown and is designated 400. For example, the computer system 400 may include, implement, or be implemented by one or more components of the system 100 of FIG. 1. The computer system 400 includes a set of instructions 424 that may be executed to cause the computer system 400 to perform any one or more of the methods or computer based functions disclosed herein. The computer system 400, or any portion thereof, may operate as a standalone device or may be connected, e.g., using a network, to other computer systems or peripheral devices.

In a networked deployment, the computer system 400 may operate in the capacity of a set-top box device, a personal computing device, a mobile computing device, or some other computing device. The computer system 400 may also be implemented as or incorporated into various devices, such as a personal computer (PC), a tablet PC, a personal digital assistant (PDA), a mobile device, a palmtop computer, a laptop computer, a desktop computer, a communications device, a web appliance, a television or other display device, or any other machine capable of executing a set of instructions (sequential or otherwise) that specify actions to be taken by that machine. In a particular embodiment, the computer system 400 may be implemented using electronic devices that provide voice, video, or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics-processing unit (GPU), or both. Moreover, the computer system 400 may include a main memory 404 and a static memory 406 that may communicate with each other via a bus 408. As shown, the computer system 400 may further include or be coupled to a video display unit 410, such as a liquid crystal display (LCD), an organic light emitting diode (OLED), a flat panel display, a solid-state display, or a projection display. For example, the video display unit 410 may be the display device 110 of FIG. 1. Additionally, the computer system 400 may include an input device 412, such as a keyboard, a remote control device, and a cursor control device 414, such as a mouse. In a particular embodiment, the cursor control device 414 may be incorporated into a remote control device such as the portable device 108 of FIG. 1. The computer system 400 may also include a disk drive unit 416, a signal generation device 418, such as a speaker, and a network interface device 420. The network interface device 420 may be coupled to other devices (not shown) via a network 426, such as the network 106 of FIG. 1.

In a particular embodiment, as depicted in FIG. 4, the disk drive unit 416 may include a tangible computer-readable medium 422 in which one or more sets of instructions 424, e.g. software, may be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include tangible computer-readable media.

In an alternative embodiment, dedicated hardware implementations, such as application specific integrated circuits, programmable logic arrays and other hardware devices, may be constructed to implement one or more of the methods described herein. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computer system 400. Further, in an exemplary, non-limited embodiment, implementations may include distributed processing, component/item distributed processing, and parallel processing. Alternatively, virtual computer system processing may be used to implement one or more of the methods or functionality as described herein.

The present disclosure contemplates a tangible computer-readable (e.g., non-transitory) medium that includes instructions 424 so that a device connected to the network 426 may communicate voice, video, or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible (e.g., non-transitory) medium that is capable of storing a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes. Accordingly, the disclosure is considered to include any one or more of a computer-readable storage medium and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosure is not limited to such standards and protocols. For example, standards for Internet, other packet switched network transmission (e.g. TCP/IP, UDP/IP, HTML, X10, SIP, TR-069, INSTEON, WEP, Wi-Fi and HTTP) and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this disclosure to any particular concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, at a processor of a media device, an indication of interest in a garment depicted within media content sent to a video display, wherein the media content is television programming, a movie, or a combination thereof;
    receiving body measurement input from a body measurement scanner;
    determining, at the processor based on the media content, one or more garment identifiers associated with the garment in response to the indication of interest;
    after determining the one or more garment identifiers, generating an image representation at the processor, wherein the image representation includes a garment overlay and a viewer representation, wherein the garment overlay at least partially covers the viewer representation, wherein the viewer representation is generated based on the body measurement input, wherein the garment overlay is based at least partially on the one or more garment identifiers and at least partially on the body measurement input, and wherein generating the image representation comprises:
        searching a garment database using the one or more garment identifiers to identify a set of potential matches to the garment;
        when the set of potential matches conforms to some but not all of the one or more garment identifiers, sending to the video display an indication that the potential matches have similarities to the garment;
        prompting the viewer to select a match from the set of potential matches;
        receiving a selection of a particular match; and
        generating the image representation based at least in part on the particular match.

2. The method of claim 1, wherein the searching is conducted without accessing any garment-related metatag information within the media content.

3. The method of claim 1, further comprising:
    receiving a second indication of interest in a second garment depicted within media content sent to the video display;
    searching the garment database to attempt to identify potential matches to the second garment; and
    when no potential matches to the second garment are identified, indicating to the viewer that no potential matches to the second garment are available.

4. The method of claim 1, wherein the searching is conducted based on garment-related metatag information within the media content.

5. The method of claim 1, wherein the media device is a set-top box device, and wherein the media content is received at the set-top box device via a television network.

6. The method of claim 1, further comprising, prior to searching the garment database, receiving an image that includes a depiction of the garment within the media content, wherein the one or more garment identifiers are determined based on the image.

7. The method of claim 6, wherein the image is captured at a first device that is different from the media device, wherein the first device and the media device are associated with a common viewer account.

8. An apparatus comprising:
a processor, the processor configured to execute instructions to perform operations including:
receiving an indication of interest in a garment depicted by media content displayed at a video display, wherein the media content is television programming, a movie, a special program, or a combination thereof;
receiving body measurement input from a body measurement scanner;
determining, based on the media content, one or more garment identifiers associated with the garment in response to the indication of interest; and
after determining the one or more garment identifiers, generating an image representation including a garment overlay and a viewer representation, the garment overlay at least partially covering the viewer representation, wherein the viewer representation is generated based on the body measurement input, wherein the garment overlay is based at least partially on the one or more garment identifiers and at least partially on the body measurement input, and wherein generating the image representation comprises:
receiving an image that includes a depiction of the garment within the media content, wherein the one or more garment identifiers are determined based on the image, wherein the image is captured at a first device, wherein the image representation is generated at a second device, and wherein the first device and the second device are associated with a common viewer account;
searching a garment identifier database based upon the one or more garment identifiers to generate search results;
sending a display of the search results to the video display as potential matches to the garment; and
receiving a selection of a particular garment representation from the search results.

9. The apparatus of claim 8, wherein at least one of the one or more garment identifiers includes an identifier of a manufacturer of the garment.

10. The apparatus of claim 8, wherein at least one of the one or more garment identifiers includes at least one of a model identifier, a color identifier, a shape identifier, a pattern identifier, a print identifier, a cut identifier, and a garment designer identifier.

11. The apparatus of claim 8, wherein the viewer representation comprises a viewer avatar associated with the viewer, wherein the viewer avatar is generated with proportions based at least in part on the body measurement input.

12. The apparatus of claim 11, wherein the viewer avatar is customizable based upon viewer input.

13. The apparatus of claim 8, wherein the garment is not indicated within the media content as being for sale.

14. The apparatus of claim 8, wherein the indication of interest is received in response to viewer selection of a try-on button displayed on a display of a portable device.

15. A computer-readable storage device storing processor-executable instructions that, when executed by a processor, cause the processor to perform operations including:
receiving an indication of interest in a garment depicted by media content displayed at a video display, wherein the media content is television programming, a movie, a special program, or a combination thereof;
receiving body measurement input from a body measurement scanner;
determining, based on the media content, one or more garment identifiers associated with the garment in response to the indication of interest; and
after determining the one or more garment identifiers, generating an image representation including a garment overlay and a viewer representation, the garment overlay at least partially covering the viewer representation, wherein the viewer representation is generated based on the body measurement input, wherein the garment overlay is based at least partially on the one or more garment identifiers and at least partially on the body measurement input, and wherein generating the image representation comprises:
searching a garment database using the one or more garment identifiers to identify a set of potential matches, wherein the searching is conducted without accessing garment-related metatag information within the media content;
prompting the viewer to select a match from the set of potential matches;
receiving a selection of a particular match; and
determining the image representation based at least in part on the particular match.

16. The computer-readable storage device of claim 15, wherein the operations further include searching a database for a garment representation associated with the one or more garment identifiers.

17. The computer-readable storage device of claim 16, wherein the database is searched based on at least one of a timestamp associated with the media content and an indication of a provider channel associated with the media content.

* * * * *